(12) United States Patent
Mehta et al.

(10) Patent No.: US 9,219,369 B2
(45) Date of Patent: Dec. 22, 2015

(54) MULTIPHASE CHARGER

(71) Applicant: QUALCOMM Incorporated, San Diego, CA (US)

(72) Inventors: Narendra Singh Mehta, Santa Clara, CA (US); Chris M Rosolowski, San Diego, CA (US); Sandeep Chaman Dhar, San Diego, CA (US); Todd R Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 13/841,511

(22) Filed: Mar. 15, 2013

(65) Prior Publication Data

US 2014/0266011 A1 Sep. 18, 2014

(51) Int. Cl.
*H02J 7/00* (2006.01)
*H02M 3/158* (2006.01)
*H02M 1/00* (2007.01)

(52) U.S. Cl.
CPC .............. *H02J 7/0042* (2013.01); *H02J 7/0055* (2013.01); *H02M 3/1582* (2013.01); *H02M 3/1584* (2013.01); *H02J 2007/0059* (2013.01); *H02M 2001/008* (2013.01); *H02M 2001/0067* (2013.01)

(58) Field of Classification Search
CPC ....................................................... H02J 7/0042
USPC ........................................................ 320/107
See application file for complete search history.

(56) References Cited

U.S. PATENT DOCUMENTS

| | | | |
|---|---|---|---|
| 5,291,385 A | | 3/1994 | Vinciarelli |
| 5,623,397 A | * | 4/1997 | Vinciarelli ...................... 363/20 |
| 6,137,267 A | * | 10/2000 | Kates et al. .................... 320/136 |
| 6,437,549 B1 | * | 8/2002 | Takagishi ....................... 323/282 |
| 6,650,089 B1 | * | 11/2003 | Freeman et al. ............... 320/132 |
| 6,693,782 B1 | * | 2/2004 | Lash ............................ 361/93.9 |
| 7,560,898 B1 | * | 7/2009 | Kranzen et al. ............... 320/107 |

(Continued)

FOREIGN PATENT DOCUMENTS

| | | |
|---|---|---|
| EP | 2337184 A2 | 6/2011 |
| EP | 2562030 A2 | 2/2013 |

OTHER PUBLICATIONS

International Search Report and Written Opinion—PCT/US2014/022827—ISA/EPO—Feb. 27, 2015.

(Continued)

*Primary Examiner* — Richard Isla Rodas
*Assistant Examiner* — Dung V Bui
(74) *Attorney, Agent, or Firm* — Fountainhead Law Group P.C.

(57) ABSTRACT

An electronic device is described. The electronic device includes a first port. The electronic device also includes a second port. The electronic device further includes a multiphase charger. The multiphase charger includes a first buck. The multiphase charger also includes a second buck. The multiphase charger further includes a first port switch. The multiphase charger also includes a second port switch. The multiphase charger further includes a reverse boost switch. The multiphase charger also includes a multiphase switch.

28 Claims, 9 Drawing Sheets

(56) References Cited

U.S. PATENT DOCUMENTS

| | | | |
|---|---|---|---|
| 2009/0174366 A1 | 7/2009 | Ahmad et al. | |
| 2011/0298426 A1 | 12/2011 | Hussain et al. | |
| 2012/0043818 A1* | 2/2012 | Stratakos et al. | 307/77 |
| 2012/0105040 A1 | 5/2012 | Leipold et al. | |
| 2012/0139479 A1* | 6/2012 | Yun | 320/107 |
| 2012/0311203 A1* | 12/2012 | Monks et al. | 710/63 |
| 2013/0207731 A1* | 8/2013 | Balteanu | 330/296 |
| 2013/0301314 A1* | 11/2013 | Fu et al. | 363/37 |
| 2014/0266011 A1* | 9/2014 | Mehta et al. | 320/107 |

OTHER PUBLICATIONS

Legates B., "Complete USB Power Manager, Li-Ion Charger and Two Buck Converters in a 4mm x 4mm QFN," Linear Technology Magazine, Feb. 2004, vol. 14 (1), pp. 1-5.

ThomasNet Industrial News, "Power Management ICs suit converged portable products," Dec. 1, 2006. New York, NY: Alacra Store. Retrieved Feb. 6, 2013 from <http://www.alacrastore.com/storecontent/ThomasNet_Industrial_News-Power_Management_ICs_suit_converged_portable_products-2056-57950>.

* cited by examiner

MULTIPHASE CHARGER

TECHNICAL FIELD

The present disclosure relates generally to electronic communications. More specifically, the present disclosure relates to systems and methods for a multiphase charger that can provide simultaneous buck charging and reverse boost charging.

BACKGROUND

Electronic devices are widely deployed and provide a wide range of functionalities. For example, electronic devices may be used for wireless communications, gaming, position location (such as GPS), personal tracking, monitoring machines and word processing. These electronic devices are often battery operated. Thus, there is a need to minimize the power consumption of an electronic device. These electronic devices are also getting smaller. There is also a need to minimize the real estate used in electronic devices.

One improvement to electronic devices being considered is the use of dual ports. Dual ports allow an electronic device to use dual charging (where multiple chargers are plugged into a single electronic device, thereby decreasing the charging time of the electronic device battery) and boost back charging (where the charger plugged in and/or the battery are used to power an external device such as a keyboard or a screen). Benefits may be realized by improvements to electronic devices that allow the electronic devices to occupy less space while minimizing the battery charging time and that allow for increased functionality (such as boost back charging).

SUMMARY

An electronic device is described. The electronic device includes a first port, a second port, and a multiphase charger. The multiphase charger includes a first buck, a second buck, a first port switch, a second port switch, a reverse boost switch, and a multiphase switch.

The first port switch may be coupled between the first port and the first buck. The multiphase switch may be coupled between the first buck and the second buck. The second port switch may be coupled between the second port and the reverse boost switch. The reverse boost switch may be coupled between the second port switch and the second buck.

The electronic device may be operating in charging on one port and boosting back on another port mode. An external charger may provide an input voltage to the first port. The second port switch and the reverse boost switch may provide a boost back voltage to the second port to power an external device. The first port switch may be closed. The second port switch may also be closed. The reverse boost switch may further be closed. The multiphase switch may be open.

An external charger may instead provide an input voltage to the second port. A polarity of a diode in the multiphase switch may be flipped. The first port switch and the multiphase switch may provide a boost back voltage to the first port to power an external device. In this configuration, the first port switch may be closed, the second port switch may be closed, the reverse boost switch may be closed, and the multiphase switch may be open.

The multiphase charger may allow the electronic device to operate in one of a dual charging mode, charging on one port and boosting back on another port mode, single boost back mode and dual boost back mode. Each buck may include a charging switch, a discharging switch, an inductor and a capacitor. A ratio between the charging switch turned on and the discharging switch turned on may adjust a voltage output by a buck.

A controller/gate driver may control the charging switch and discharging switch in a buck. A first controller/gate driver may control the first port switch, the multiphase switch and the first buck. A second controller/gate driver may control the second port switch, the reverse boost switch and the second buck.

The electronic device may be operating in dual charging mode. A first charger may be coupled to the first port and a second charger may be coupled to the second port. The multiphase switch may be open. The first buck may charge a battery during a first phase. The second buck may charge the battery during a second phase. Therein the first port switch, the second port switch and the reverse boost switch may be closed. The first charger may provide a first input voltage to the first port, and the second charger may provide a second input voltage to the second port.

The electronic device may be operating in single boost back mode. The multiphase charger may provide a boost back voltage to the second port.

A method for using a multiphase charger on an electronic device that includes a first port and a second port is also described. A boost back voltage is provided to an external device via the second port. A charging voltage is detected on the first port. A first port switch, a second port switch, a multiphase switch and a reverse boost switch are adjusted to provide the charging voltage to a battery and the boost back voltage to the external device.

The boost back voltage may be provided to the second port by charging a capacitor coupled between the second port and ground using the second buck.

An apparatus is described. The apparatus includes a first port and a second port. The apparatus also includes means for providing a boost back voltage to an external device via the second port. The apparatus further includes means for detecting a charging voltage on the first port. The apparatus also includes means for adjusting a first port switch, a second port switch, a multiphase switch and a reverse boost switch to provide the charging voltage to a battery and the boost back voltage to the external device.

A computer-program product for using a multiphase charger on an electronic device that includes a first port and a second port is also described. The computer-program product includes a non-transitory computer-readable medium having instructions thereon. The instructions include code for causing an electronic device to provide a boost back voltage to an external device via the second port. The instructions also include code for causing the electronic device to detect a charging voltage on the first port. The instructions further include code for causing the electronic device to adjust a first port switch, a second port switch, a multiphase switch and a reverse boost switch to provide the charging voltage to a battery and the boost back voltage to the external device.

DETAILED DESCRIPTION

Figure 1:
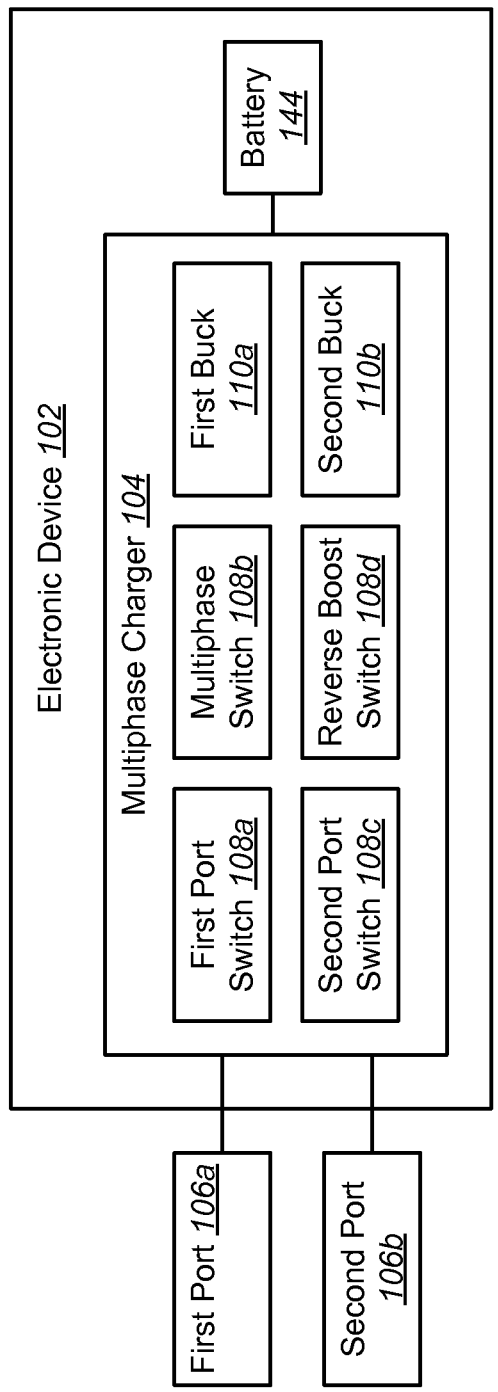
FIG. 1 is a block diagram of an electronic device for use in the present systems and methods.

FIG. 1 is a block diagram of an electronic device 102 for use in the present systems and methods. The electronic device 102 may be a base station, a wireless communication device, or other device that uses electricity and includes a battery 144. The electronic device 102 may include a first port 106a and a second port 106b. In one configuration, the first port 106a and the second port 106b may each be universal serial bus (USB) ports that facilitate charging of the battery 144. The first port 106a and the second port 106b may also be other types of ports that allow access to the electronic device 102, such as micro-USB ports. In one configuration, the first port 106a may be a different type of port than the second port 106b (e.g., the first port 106a is a dock and the second port 106b is a wall charger). The electronic device 102 may include a multiphase charger 104. The multiphase charger 104 may allow the electronic device 102 to charge the battery 144 using multiple chargers (i.e., a first charger coupled to the first port 106a and a second charger coupled to the second port 106b). The multiphase charger 104 may also allow the electronic device 102 to charge the battery 144 using one of the ports 106 while providing power to an external device using the other port 106 (referred to as boost back charging). The multiphase charger 104 may use multiphase charging that charges the battery 144 using both a first buck 110a and a second buck 110b. Multiphase charging allows the first buck 110a and the second buck 110b to use significantly smaller components (and potentially less power).

A base station is a station that communicates with one or more wireless communication devices. A base station may also be referred to as, and may include some or all of the functionality of, an access point, a broadcast transmitter, a NodeB, an evolved NodeB, etc. Each base station provides communication coverage for a particular geographic area. A base station may provide communication coverage for one or more wireless communication devices. The term "cell" can refer to a base station and/or its coverage area depending on the context in which the term is used.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, etc.

The multiphase charger 104 may be coupled to both the first port 106a and the second port 106b. The multiphase charger 104 may include a first port switch 108a, a second port switch 108c, a multiphase switch 108b and a reverse boost switch 108d. As discussed above, the multiphase charger 104 may also include a first buck 110a and a second buck 110b. Each of the bucks 110 may include switches, inductors and capacitors. By rapidly adjusting the switches, the voltage across the capacitor may be maintained at the proper charging voltage for the battery 144.

Typically, the inductor in a buck 110 is much larger than all the other components within the electronic device 102. For example, the inductor in a buck 110 may be comparable to the size of the entire integrated circuit within the electronic device 102. Using a multiphase charger 104 allows for the use of inductors that are one-fourth of the size of inductors required in a buck 110 of a single phase charger (and consequently switches that are one-half size). Use of a multiphase charger 104 may also allow for increased functionality of the electronic device 102. For example, the multiphase charger 104 may allow the electronic device 102 to use dual charging (charging by both the first port 106a and the second port 106b). Dual charging may decrease the amount of time required to charge the battery 144 by maximizing the charge current. As another example, the multiphase charger 104 may allow the electronic device 102 to boost back to one or both ports 106 (i.e., provide a voltage at one or both ports 106 that can power external devices such as external screens, an external mouse, external speakers, an external keyboard, etc.). The multiphase charger 104 may provide the appropriate boost back voltage to an external device (i.e., the multiphase charger 104 can adjust the boost back voltage provided to one or both ports 106 to match the required voltage of the external device).

Figure 2:
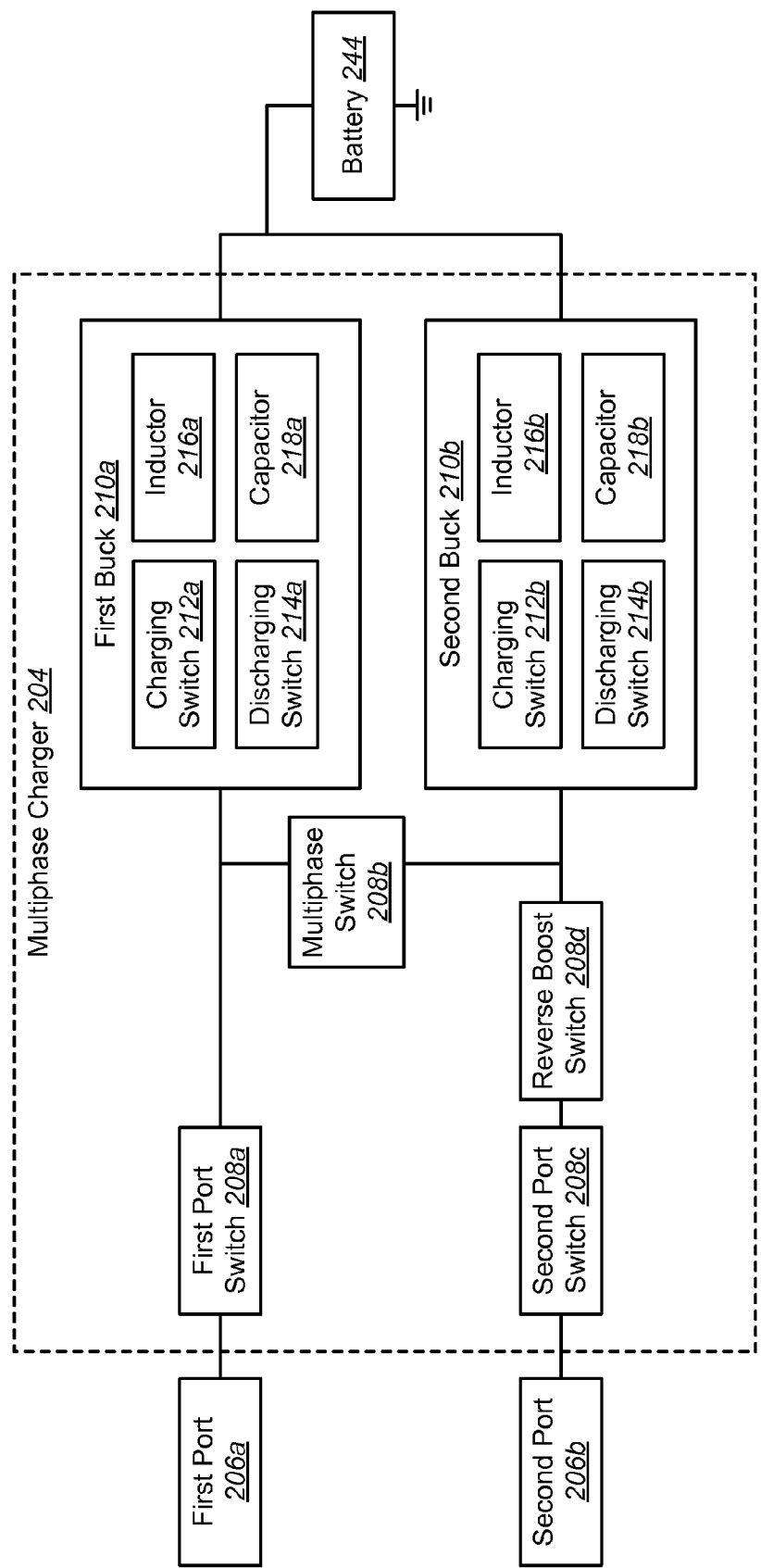
FIG. 2 is a block diagram of a multiphase charger for use in the present systems and methods.

FIG. 2 is a block diagram of a multiphase charger 204 for use in the present systems and methods. The multiphase charger 204 of FIG. 2 may be one configuration of the multiphase charger 104 of FIG. 1. The multiphase charger 204 may be coupled to both a first port 206a and a second port 206b. As discussed above, the first port 206a and the second port 206b may each provide external access to the multiphase charger 204. In one configuration, the first port 206a and the second port 206b may each be USB ports.

The first port 206a may be coupled to a first port switch 208a. The first port switch 208a may allow the multiphase charger 204 to disconnect the first port 206a from the multiphase charger 204. The first port switch 208a may be coupled to a first buck 210a and a multiphase switch 208b. The second port 206b may be coupled to a second port switch 208c. The second port switch 208c may allow the multiphase charger 204 to disconnect the second port 206b from the multiphase charger 204. The second port switch 208c may be coupled to a reverse boost switch 208d. The reverse boost switch 208d may be used to provide a variable boost back voltage to the second port 206b (from the first port 206a, the battery 244, or both). The reverse boost switch 208d may couple the second port switch 208c to the multiphase switch 208b and to a second buck 210b.

The first buck 210a may include a charging switch 212a, a discharging switch 214a, an inductor 216a and a capacitor 218a. During charging of the battery 244, a voltage may be applied to the input of the first buck 210a. The charging switch 212a and the discharging switch 214a may alternate between applying the input voltage to the inductor 216a and coupling the inductor 216a to ground, thereby charging the capacitor 218a. By adjusting the ratio between the on time of the charging switch 212a and the on time of the discharging switch 214a, a desired voltage across the capacitor 218a may be maintained, allowing for the charging of the battery 244 (by providing current to the battery 244).

The second buck 210b may include a charging switch 212b, a discharging switch 214b, an inductor 216b and a capacitor 218b. During charging of the battery 244, a voltage may be applied to the input of the second buck 210b. The charging switch 212b and the discharging switch 214b may alternate between applying the input voltage to the inductor 216b and coupling the inductor 216b to ground, thereby charging the capacitor 218b. By adjusting the ratio between the on time of the charging switch 212b and the on time of the discharging switch 214b, a desired voltage across the capacitor 218b may be maintained, allowing for the charging of the battery 244.

The multiphase charger 204 may deliver the same amount of power to the battery 244 as a single phase charger by delivering half the power through the first buck 210a and half the power through the second buck 210b. The first buck 210a may be 180 degrees out of phase from the second buck 210b. As a consequence, each of the bucks 210 may only carry one-half of the current that a single buck in a single phase charger carries. The size of the inductor 216 in each buck 210 is proportional to the current $i^2$. A large inductor 216 size is required to meet the high charge current requirements (which may be greater than 6 amps (A)). Thus, a reduction of the current by one-half proportionally allows the size of the inductor 216 to be reduced to one-fourth of the size. Reducing the size of the inductor 216 in each buck 210 may reduce the amount of real estate needed for the multiphase charger 204, thereby reducing the cost of the electronic device 102. Furthermore, reducing the current by one-half allows smaller switches to be used in the multiphase charger 204. This is because an integrated switch must be sized to carry the rated load current, where the current through the switch is proportional to the switch area. Hence, if only half the current is conducting through a switch, the area is effectively cut by one-half. However, this may not result in a reduced die area, since additional switches may be needed in the multiphase charger 204.

Every power switch may need a driver. Reducing the switch size by half may also reduce the parasitics of the switch (which are also proportional to the switch area). Thus, reducing the size of a switch may reduce the required driver size and driver power. Multiphase chargers 204 may be more efficient than other chargers because the sum of losses in the system is lower (including reduced loss in inductors, power switches and the driver). Thus, although the area savings benefits may be negligible, efficiency benefits may be significant.

The switches 208 and bucks 210 in the multiphase charger 204 may allow the multiphase charger 204 to operate in multiple configurations. The multiphase switch 208b (when closed) may allow the multiphase charger 204 to charge the battery 244 using both the first buck 210a and the second buck 210b when a charger (or other power source) is plugged into only one port 206. When the multiphase switch 208b is open, the multiphase charger 204 may charge the battery 244 using two different chargers (or power sources), each plugged into one of the ports 206, even if the chargers provide different supply voltages. For example, if a 5 volt (V) charger is plugged into the first port 206a and a 10 V charger is plugged into the second port 206b, the multiphase switch 208b may be open so that the first buck 210a can buck the 5 V down to the voltage needed for the battery 244 (e.g., 4 V) and the second buck 210b can buck the 10 V down to the voltage needed for the battery 244.

The multiphase charger 204 may be configured to operate in charging on one port and boosting back on another port mode. In charging on one port and boosting back on another port mode, either port 206 may be used for charging or boost back. In one configuration, a charger may be plugged into the first port 206a and an external device may be plugged into the second port 206b. The external device may require power from the electronic device 102 (e.g., a voltage different from the voltage of the battery 244 and the voltage of the charger). The multiphase switch 208b may be closed, allowing the first buck 210a to buck the input voltage of the first port 206a to the charging voltage of the battery 244 while also allowing the second buck 210b to boost back the required voltage to the second port 206b (using the reverse boost switch 208d). In another configuration, a charger may be plugged into the second port 206b and an external device may be plugged into the first port 206a. For the multiphase charger 204a to provide a boost back voltage to the first port 206a, the polarity on a diode within the multiphase switch 208b may be required to be flipped by the multiphase charger 204.

Figure 3:
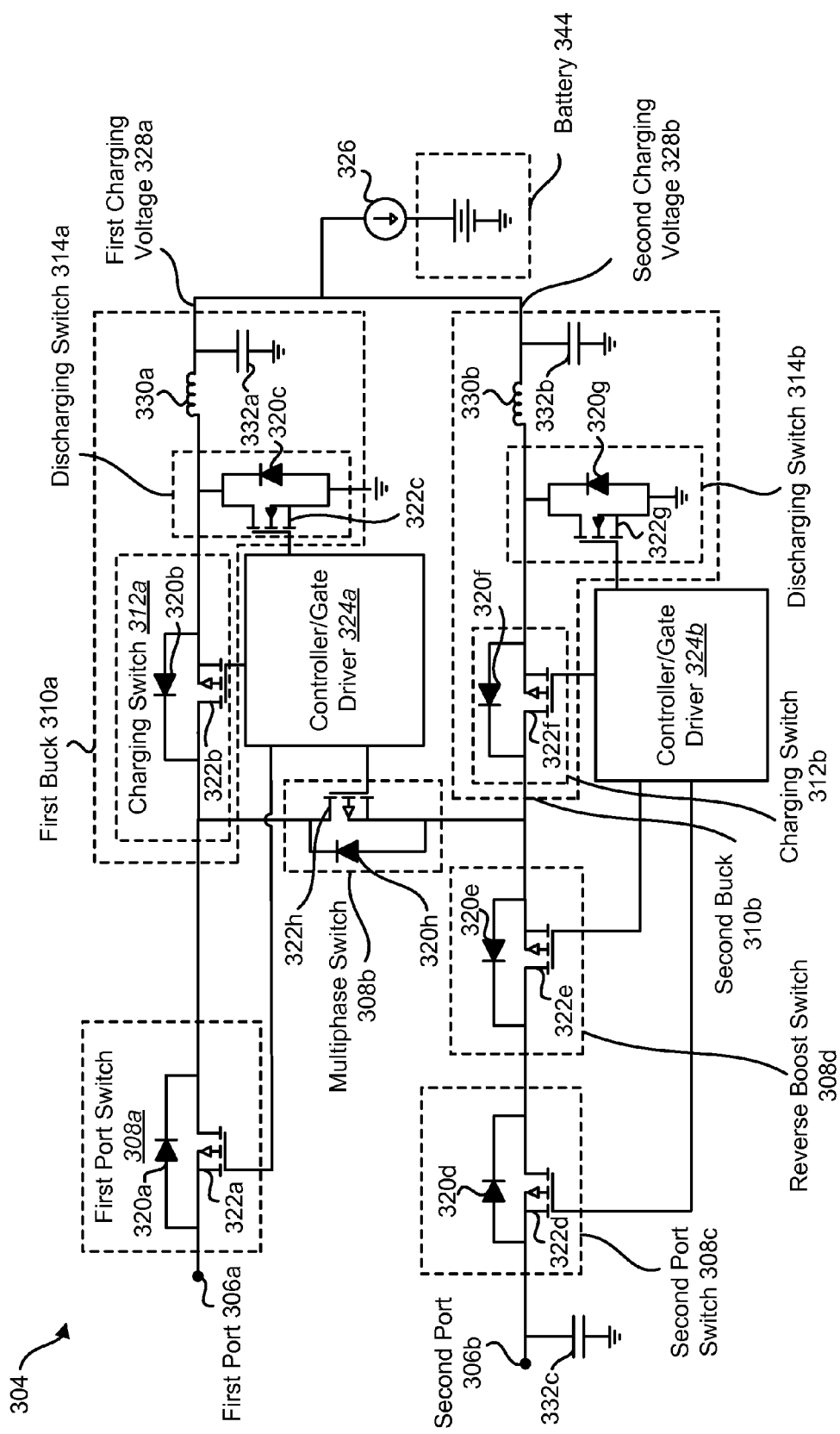
FIG. 3 is a circuit diagram illustrating a multiphase charger.

FIG. 3 is a circuit diagram illustrating a multiphase charger 304. The multiphase charger 304 of FIG. 3 may be one configuration of the multiphase charger 104 of FIG. 1. The multiphase charger 304 may include a first port switch 308a, a second port switch 308c, a multiphase switch 308b, a reverse boost switch 308d, a first buck 310a and a second buck 310b. The multiphase charger 304 may be used to charge a battery 344 and/or provide a boost back voltage to a port 306.

The diodes 320a-g shown in FIG. 3 are inherent structures to the switches (e.g., the power field-effect transistors (FETs) 322a-g) and are not additional diode components added to the multiphase charger 304. The diodes 320a-g are shown because it is common to illustrate them to show the body diode in industry and because the diodes 320 illustrate the inherent blocking achieved by the power field-effect transistors (FETs) 322.

The first port switch 308a may include a first diode 320a and a first power field-effect transistor (FET) 322a. The source of the first power field-effect transistor (FET) 322a may be coupled to the first port 306a. The anode of the first diode 320a may be coupled to the source of the first power field-effect transistor (FET) 322a. The cathode of the first diode 320a may be coupled to the drain of the first power field-effect transistor (FET) 322a. The gate of the first power field-effect transistor (FET) 322a may be coupled to a first controller/gate driver 324a. The first controller/gate driver 324a may control the first port switch 308a, the multiphase switch 308b and the first buck 310a.

The first buck 310a may include a charging switch 312a and a discharging switch 314a. The charging switch 314a may include a second diode 320b and a second power field-effect transistor (FET) 322b. The drain of the second power field-effect transistor (FET) 322b may be coupled to the drain of the first power field-effect transistor (FET) 322a. The gate of the second power field-effect transistor (FET) 322b may be coupled to the first controller/gate driver 324a. The cathode of the second diode 320b may be coupled to the drain of the second power field-effect transistor (FET) 322b. The anode of the second diode 320b may be coupled to the source of the second power field-effect transistor (FET) 322b.

The discharging switch 314a may include a third power field-effect transistor (FET) 322c and a third diode 320c. The drain of the third power field-effect transistor (FET) 322c may be coupled to the source of the second power field-effect transistor (FET) 322b. The source of the third power field-effect transistor (FET) 322c may be coupled to ground. The gate of the third power field-effect transistor (FET) 322c may be coupled to the first controller/gate driver 324a. The anode of the third diode 320c may be coupled to ground. The cathode of the third diode 320c may be coupled to the drain of the third power field-effect transistor (FET) 322c.

The first buck 310a may also include an inductor 330a and a capacitor 332a. The capacitor 332a may be coupled between the inductor 330a and ground. The inductor 330a may be coupled between the capacitor 332a and the drain of the third power field-effect transistor (FET) 322c. Thus, the inductor 330a is coupled to both the charging switch 312a and the discharging switch 314a. The inductor 330a may also be coupled to the positive terminal of the battery 344. Depending on the input voltage from a charger (plugged into either the first port 306a or the second port 306b) and the charging voltage needed to charge the battery 344, the first controller/gate driver 324a may alternate between turning on the second power field-effect transistor (FET) 322b (with the third power field-effect transistor (FET) 322c turned off), allowing the inductor 330a to charge the capacitor 332a, and turning on the third power field-effect transistor (FET) 322c (with the second power field-effect transistor (FET) 322b turned off), allowing the inductor 330a to discharge the capacitor 332a.

The voltage across the capacitor 332a may be referred to as the first charging voltage 328a. If a higher first charging voltage 328a is needed, the charging switch 312a will be turned on longer relative to the discharging switch 314a. Likewise, if a lower first charging voltage 328a is needed, the discharging switch 314a will be turned on longer relative to the charging switch 312a. The first charging voltage 328a may operate as a current source 326 to the battery 344, charging the battery 344.

The second port switch 308c may include a fourth diode 320d and a fourth power field-effect transistor (FET) 322d. The source of the fourth power field-effect transistor (FET) 322d may be coupled to the second port 306b. The anode of the fourth diode 320d may be coupled to the source of the fourth power field-effect transistor (FET) 322d. The cathode of the fourth diode 320d may be coupled to the drain of the fourth power field-effect transistor (FET) 322d. The gate of the fourth power field-effect transistor (FET) 322d may be coupled to a second controller/gate driver 324b. The second controller/gate driver 324b may control the second port switch 308c, the reverse boost switch 308d and the second buck 310b.

The reverse boost switch 308d may include a fifth diode 320e and a fifth power field-effect transistor (FET) 322e. The drain of the fifth power field-effect transistor (FET) 322e may be coupled to the drain of the fourth power field-effect transistor (FET) 322e. The gate of the fifth power field-effect transistor (FET) 322e may be coupled to the second controller/gate driver 324b. The anode of the fifth diode 320e may be coupled to the source of the fifth power field-effect transistor (FET) 322e. The cathode of the fifth diode 320e may be coupled to the drain of the fifth power field-effect transistor (FET) 322e.

The second buck 310b may include a charging switch 312b and a discharging switch 314b. The charging switch 314b may include a sixth diode 320f and a sixth power field-effect transistor (FET) 322f. The drain of the sixth power field-effect transistor (FET) 322f may be coupled to the drain of the fifth power field-effect transistor (FET) 322e. The gate of the sixth power field-effect transistor (FET) 322f may be coupled to the second controller/gate driver 324b. The cathode of the sixth diode 320f may be coupled to the drain of the sixth power field-effect transistor (FET) 322f. The anode of the sixth diode 320f may be coupled to the source of the sixth power field-effect transistor (FET) 322f.

The discharging switch 314b may include a seventh power field-effect transistor (FET) 322g and a seventh diode 320g. The drain of the seventh power field-effect transistor (FET) 322g may be coupled to the source of the sixth power field-effect transistor (FET) 322f. The source of the seventh power field-effect transistor (FET) 322g may be coupled to ground. The gate of the seventh power field-effect transistor (FET) 322g may be coupled to the second controller/gate driver 324b. The anode of the seventh diode 320g may be coupled to ground. The cathode of the seventh diode 320g may be coupled to the drain of the seventh power field-effect transistor (FET) 322g.

The second buck 310b may also include an inductor 330b and a capacitor 332b. The capacitor 332b may be coupled between the inductor 330b and ground. The inductor 330b may be coupled between the capacitor 332b and the drain of the seventh power field-effect transistor (FET) 322g. Thus, the inductor 330b is coupled to both the charging switch 312b and the discharging switch 314b. The inductor 330b may also be coupled to the positive terminal of the battery 344. Depending on the input voltage from a charger (plugged into either the first port 306a or the second port 306b) and the charging voltage needed to charge the battery 344, the second controller/gate driver 324b may alternate between turning on the sixth power field-effect transistor (FET) 322f (with the seventh power field-effect transistor (FET) 322g turned off), allowing the inductor 330b to charge the capacitor 332b, and turning on the seventh power field-effect transistor (FET) 322g (with the sixth power field-effect transistor (FET) 322f turned off), allowing the inductor 330b to discharge the capacitor 332b.

The voltage across the capacitor 332b may be referred to as the second charging voltage 328b. If a higher second charging voltage 328b is needed, the charging switch 312b will be turned on longer relative to the discharging switch 314b. Likewise, if a lower second charging voltage 328b is needed, the discharging switch 314b will be turned on longer relative to the charging switch 312b. The second charging voltage 328b may operate as a current source 326 to the battery 344, charging the battery 344.

The multiphase switch 308b may be coupled between the first buck 310a and the second buck 310b. The multiphase switch 308b may include an eighth power field-effect transistor (FET) 322h and an eighth diode 320h. The source of the eighth power field-effect transistor (FET) 322h may be coupled to the drain of the fifth power field-effect transistor (FET) 322e. The drain of the eighth power field-effect transistor (FET) 322h may be coupled to the drain of the second power field-effect transistor (FET) 322b. The gate of the eighth power field-effect transistor (FET) 322h may be coupled to the first controller/gate driver 324a. The anode of the eighth diode 320h may be coupled to the source of the eighth power field-effect transistor (FET) 322h. The cathode of the eighth diode 320h may be coupled to the drain of the eighth power field-effect transistor (FET) 322h. In one configuration, the multiphase switch 308h may be replaced with an N-type metal-oxide-semiconductor (NMOS) configurable back gate.

As discussed above, the multiphase switch 308b may allow the multiphase charger 304 to switch between modes (e.g., dual charging using a first charger plugged into the first port 306a and a second charger plugged into the second port 306b, single charging using a charger plugged into either the first port 306a or the second port 306b, charging/boost back (where a charger is plugged into the first port 306a and an external device is powered using the second port 306b), and boost back (where an external device is powered using the second port 306b)).

The boost back voltage may be provided to either the first port 306a or the second port 306b. For example, in single boost back, the multiphase charger 304 may provide a boost back voltage to one of the first port 306a or the second port 306b (whichever requires a boost back voltage). During boost back/charging mode, one of the ports 306 is charging the battery 344 while the other port 306 provides a boost back voltage.

If the first port 306a is charging the battery 344, the second buck 310b may work as a boost back switch network. The second port switch 308c and the reverse boost switch 308d may each be closed, allowing a boosted voltage on the second port 306b (e.g., by charging a capacitor 332c coupled between the second port 306b and ground). The voltage across the capacitor 332c may be adjusted (to provide the required boost back voltage) by adjusting the amount of time that the second buck 310b charges the capacitor 332c. The multiphase switch 308b may be open during this operation. However, this configuration assumes that the voltage at the first port 306a is higher than the boost back voltage (and hence there is no power path between the charging network and the boost back switch network). If the voltage at the first port 306a is not higher than the boost back voltage, the controller/gate driver 324a may adjust the polarity of the diode 320h to allow for the boost back.

If the second port 306b is charging the battery 344, the first buck 310a may work as a boost back switch network. In this configuration, the first port switch 308a is open and the multiphase switch 308b is also open. For this configuration, there is no restriction on the charging voltage of the second port 306b (e.g., the charging voltage of the second port 306b can be lower or higher than the boost back voltage on the first port 306a).

Figure 4:
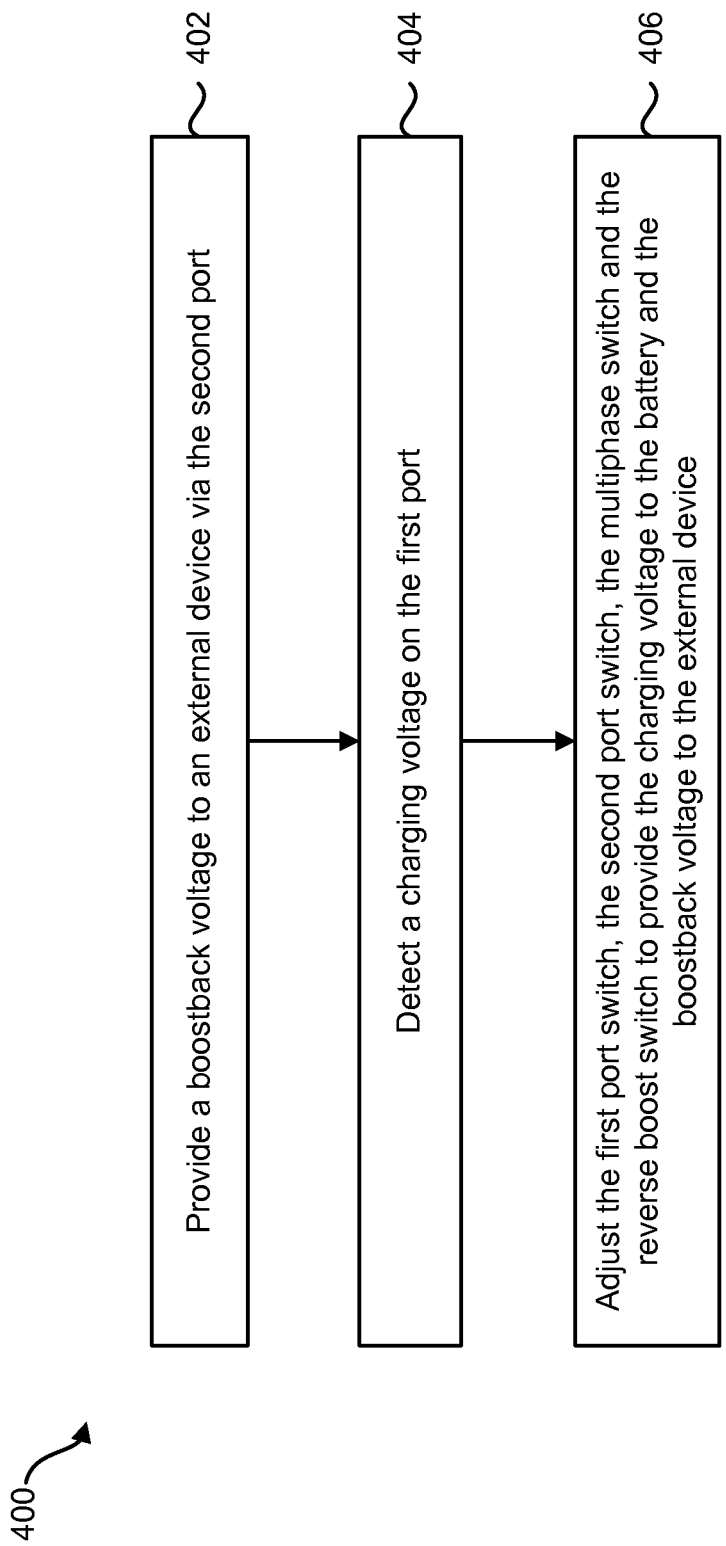
FIG. 4 is a flow diagram of a method for charging a battery using a multiphase charger.

FIG. 4 is a flow diagram of a method 400 for using a multiphase charger 104. The method 400 may be performed by an electronic device 102. The electronic device 102 may include a multiphase charger 104. The electronic device 102 may provide 402 a boost back voltage to an external device via the second port 206b. The external device may be powered speakers, external lighting, external memory, an external fan, etc. The boost back voltage provided to the external device may be provided by the battery 244 on the electronic device 102.

The electronic device 102 may detect 404 a charging voltage on the first port 206a. For example, the electronic device 102 may detect that a power charger has been plugged into the first port 206a. The electronic device 102 may adjust 406 the first port switch 208a, the second port switch 208c, the multiphase switch 208b and the reverse boost switch 208d to provide the charging voltage to the battery 244 and the boost back voltage to the external device.

Figure 5:
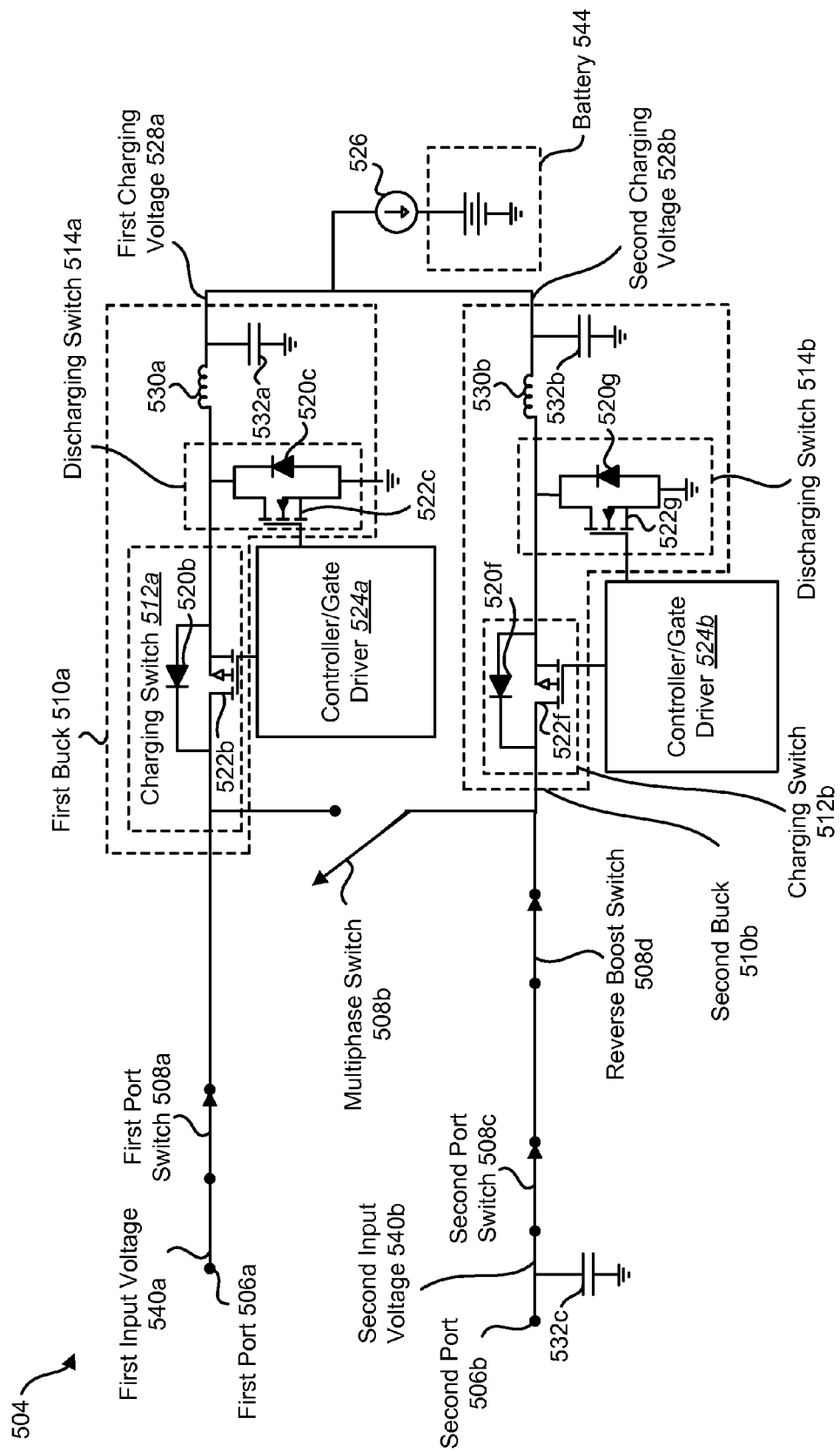
FIG. 5 is a circuit diagram illustrating a multiphase charger that is operating in dual-charge mode.

FIG. 5 is a circuit diagram illustrating a multiphase charger 504 that is operating in dual-charge mode. The multiphase charger 504 of FIG. 5 may be one configuration of the multiphase charger 104 of FIG. 1. The multiphase charger 504 may be located on an electronic device 102 that includes a first port 506a and a second port 506b. The multiphase charger 504 may include a first port switch 508a, a second port switch 508c, a multiphase switch 508b, a reverse boost switch 508d, a first buck 510a and a second buck 510b. The multiphase charger 504 may charge a battery 544 using two charging sources. A first charging source may be coupled to the first port 506a and a second charging source may be coupled to the second port 506b. Thus, the multiphase charger 504 may receive a first input voltage 540a from the first port 506a and a second input voltage 540b from the second port 506b. The first input voltage 540a and the second input voltage 540b may be the same voltage (e.g., when the first charger and the second charger are of the same type) or different voltages (e.g., when different types of chargers are plugged into each of the ports 506).

The diodes 520 shown in FIG. 5 are inherent structures to the switches (e.g., the power field-effect transistors (FETs) 522) and are not additional diode components added to the multiphase charger 504. The diodes 520 are shown because it is common to illustrate them to show the body diode in industry and because the diodes 520 illustrate the inherent blocking achieved by the power field-effect transistors (FETs) 522.

A first controller/gate driver 524a may control the first port switch 508a, the multiphase switch 508b and the first buck 510a. A second controller/gate driver 524b may control the second port switch 508c, the reverse boost switch 508d and the second buck 510b. For simplicity, some of the switches in FIG. 5 are illustrated as open or closed. Specifically, in this configuration the first port switch 508a, the second port switch 508c and the reverse boost switch 508d are closed, while the multiphase switch 508b is open.

The first buck 510a may include a charging switch 512a and a discharging switch 514a. The first port switch 508a may be coupled between the first port 506a and the charging switch 512a. As discussed above, the first port switch 508a may be closed. The charging switch 512a may include a second diode 520b and a second power field-effect transistor (FET) 522b. The drain of the second power field-effect transistor (FET) 522b may be coupled to the first port switch 508a. The gate of the second power field-effect transistor (FET) 522b may be coupled to the first controller/gate driver 524a. The cathode of the second diode 520b may be coupled to the drain of the second power field-effect transistor (FET) 522b. The anode of the second diode 520b may be coupled to the source of the second power field-effect transistor (FET) 522b.

The discharging switch 514a may include a third power field-effect transistor (FET) 522c and a third diode 520c. The drain of the third power field-effect transistor (FET) 522c may be coupled to the source of the second power field-effect transistor (FET) 522b. The source of the third power field-effect transistor (FET) 522c may be coupled to ground. The gate of the third power field-effect transistor (FET) 522c may be coupled to the first controller/gate driver 524a. The anode of the third diode 520c may be coupled to ground. The cathode of the third diode 520c may be coupled to the drain of the third power field-effect transistor (FET) 522c.

The first buck 510a may also include an inductor 530a and a capacitor 532a. The capacitor 532a may be coupled between the inductor 530a and ground. The inductor 530a may be coupled between the capacitor 532a and the drain of the third power field-effect transistor (FET) 522c. Thus, the inductor 530a is coupled to both the charging switch 512a and the discharging switch 514a. The inductor 530a may also be coupled to the positive terminal of the battery 544. Depending on the first input voltage 540a from the first charger (plugged into the first port 506a) and the charging voltage needed to charge the battery 544, the first controller/gate driver 524a may alternate between turning on the second power field-effect transistor (FET) 522b (with the third power field-effect transistor (FET) 522c turned off), allowing the inductor 530a to charge the capacitor 532a, and turning on the third power field-effect transistor (FET) 522c (with the second power field-effect transistor (FET) 522b turned off), allowing the inductor 530a to discharge the capacitor 532a.

The voltage across the capacitor 532a may be referred to as the first charging voltage 528a. If a higher first charging voltage 528a is needed, the charging switch 512a will be turned on longer relative to the discharging switch 514a. Likewise, if a lower first charging voltage 528a is needed, the discharging switch 514a will be turned on longer relative to the charging switch 512a. The first charging voltage 528a may operate as a current source 526 to the battery 544, charging the battery 544 during a first phase.

The second port switch 508c may be coupled between the second port 506b and the reverse boost switch 508d. In this configuration, both the second port switch 508c and the reverse boost switch 508d are closed. The reverse boost switch 508d may be coupled to the charging switch 512b of the second buck 510b.

The second buck 510b may include the charging switch 512b and a discharging switch 514b. The charging switch 512b may include a sixth diode 520f and a sixth power field-effect transistor (FET) 522f. The drain of the sixth power field-effect transistor (FET) 522f may be coupled to the reverse boost switch 508d. The gate of the sixth power field-effect transistor (FET) 522f may be coupled to the second controller/gate driver 524b. The cathode of the sixth diode 520f may be coupled to the drain of the sixth power field-effect transistor (FET) 522f. The anode of the sixth diode 520f may be coupled to the source of the sixth power field-effect transistor (FET) 522f.

The discharging switch 514b may include a seventh power field-effect transistor (FET) 522g and a seventh diode 520g. The drain of the seventh power field-effect transistor (FET) 522g may be coupled to the source of the sixth power field-effect transistor (FET) 522f. The source of the seventh power field-effect transistor (FET) 522g may be coupled to ground. The gate of the seventh power field-effect transistor (FET) 522g may be coupled to the second controller/gate driver 524b. The anode of the seventh diode 520g may be coupled to ground. The cathode of the seventh diode 520g may be coupled to the drain of the seventh power field-effect transistor (FET) 522g.

The second buck 510b may also include an inductor 530b and a capacitor 532b. The capacitor 532b may be coupled between the inductor 530b and ground. The inductor 530b may be coupled between the capacitor 532b and the drain of the seventh power field-effect transistor (FET) 522g. Thus, the inductor 530b is coupled to both the charging switch 512b and the discharging switch 514b. The inductor 530b may also be coupled to the positive terminal of the battery 544. Depending on the second input voltage 540b from the second charger (plugged into the second port 506b) and the charging voltage needed to charge the battery 544, the second controller/gate driver 524b may alternate between turning on the sixth power field-effect transistor (FET) 522f (with the seventh power field-effect transistor (FET) 522g turned off), allowing the inductor 530b to charge the capacitor 532b, and turning on the seventh power field-effect transistor (FET) 522g (with the sixth power field-effect transistor (FET) 522f turned off), allowing the inductor 530b to discharge the capacitor 532b.

The voltage across the capacitor 532b may be referred to as the second charging voltage 528b. If a higher second charging voltage 528b is needed, the charging switch 512b will be turned on longer relative to the discharging switch 514b. Likewise, if a lower second charging voltage 528b is needed, the discharging switch 514b will be turned on longer relative to the charging switch 512b. The second charging voltage 528b may operate as a current source 526 to the battery 544, charging the battery 544 during a second phase.

The multiphase switch 508b may be coupled between the first buck 510a and the second buck 510b. In this configuration, the multiphase switch 508b may be open, allowing the first input voltage 540a to power the first buck converter 510a and the second input voltage 540b to power the second buck converter 510b.

If the first port 506a is charging the battery 544, the second buck 510b may work as a boost back switch network. The second port switch 508c and the reverse boost switch 508d may each be closed, allowing a boosted voltage on the second port 506b (e.g., by charging a capacitor 532c coupled between the second port 506b and ground). The voltage across the capacitor 532c may be adjusted (to provide the required boost back voltage) by adjusting the amount of time that the second buck 510b charges the capacitor 532c.

Figure 6:
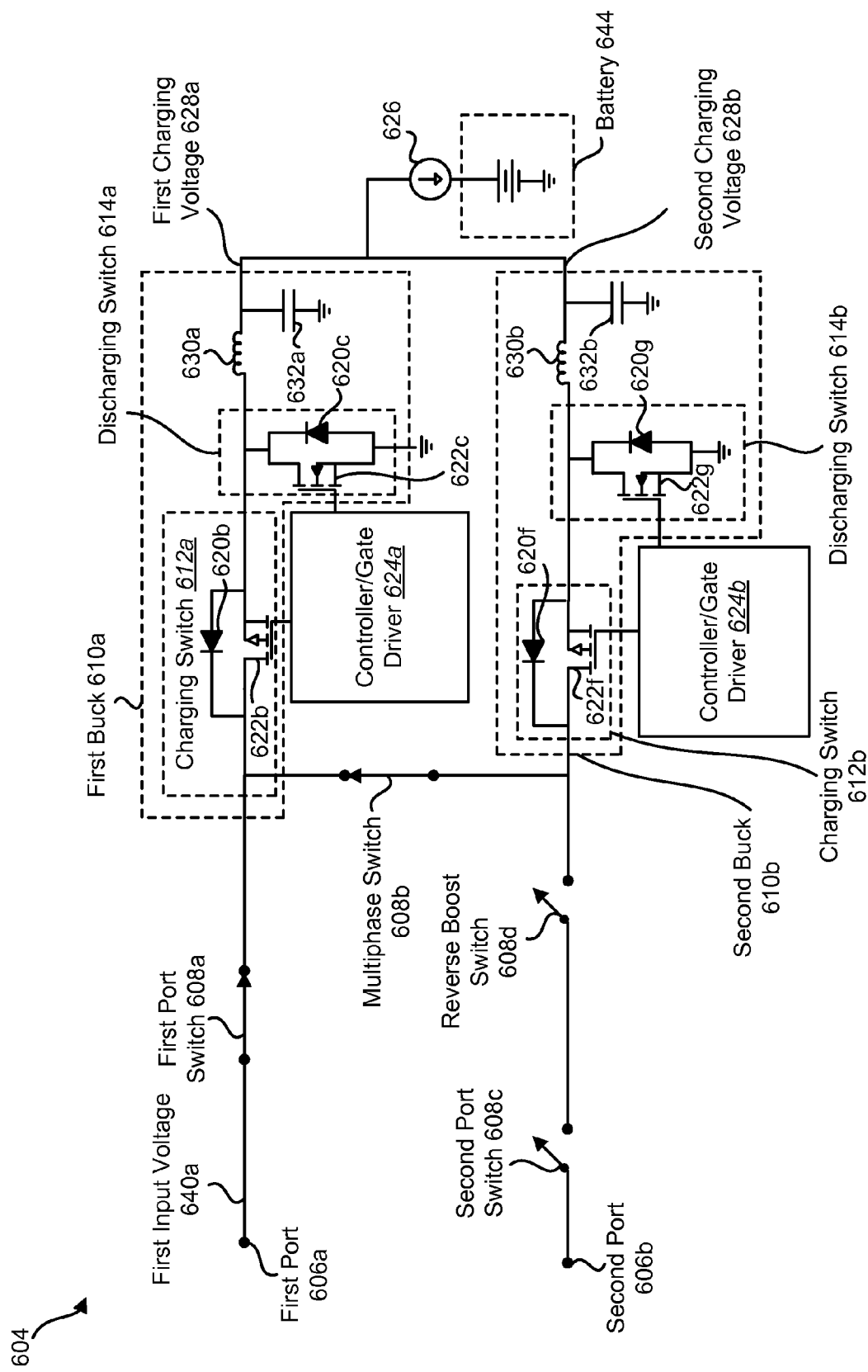
FIG. 6 is a circuit diagram illustrating a multiphase charger that is operating in single charge mode.

FIG. 6 is a circuit diagram illustrating a multiphase charger 604 that is operating in single charge mode. The multiphase charger 604 of FIG. 6 may be one configuration of the multiphase charger 104 of FIG. 1. The multiphase charger 604 may be located on an electronic device 102 that includes a first port 606a and a second port 606b. The multiphase charger 604 may include a first port switch 608a, a second port switch 608c, a multiphase switch 608b, a reverse boost switch 608d, a first buck 610a and a second buck 610b. The multiphase charger 604 may charge a battery 644 using a single charging source. A first charging source may be coupled to the first port 606a. No chargers or external devices may be coupled to the second port 606b. The multiphase charger 604 may receive a first input voltage 640a from the first port 606a.

A first controller/gate driver 624a may control the first port switch 608a, the multiphase switch 608b and the first buck 610a. A second controller/gate driver 624b may control the second port switch 608c, the reverse boost switch 608d and the second buck 610b. For simplicity, some of the switches in FIG. 6 are illustrated as open or closed. Specifically, in this configuration the first port switch 608a and the multiphase switch 608b are closed while the second port switch 608c and the reverse boost switch 608d are open.

The first buck 610a may include a charging switch 612a and a discharging switch 614a. The first port switch 608a may be coupled between the first port 606a and the charging switch 612a. As discussed above, the first port switch 608a may be closed. The charging switch 612a may include a second diode 620b and a second power field-effect transistor (FET) 622b. The drain of the second power field-effect transistor (FET) 622b may be coupled to the first port switch 608a. The gate of the second power field-effect transistor (FET) 622b may be coupled to the first controller/gate driver 624a. The cathode of the second diode 620b may be coupled to the drain of the second power field-effect transistor (FET) 622b. The anode of the second diode 620b may be coupled to the source of the second power field-effect transistor (FET) 622b.

The discharging switch 614a may include a third power field-effect transistor (FET) 622c and a third diode 620c. The drain of the third power field-effect transistor (FET) 622c may be coupled to the source of the second power field-effect transistor (FET) 622b. The source of the third power field-effect transistor (FET) 622c may be coupled to ground. The gate of the third power field-effect transistor (FET) 622c may be coupled to the first controller/gate driver 624a. The anode of the third diode 620c may be coupled to ground. The cathode of the third diode 620c may be coupled to the drain of the third power field-effect transistor (FET) 622c.

The first buck 610a may also include an inductor 630a and a capacitor 632a. The capacitor 632a may be coupled between the inductor 630a and ground. The inductor 630a may be coupled between the capacitor 632a and the drain of the third power field-effect transistor (FET) 622c. Thus, the inductor 630a is coupled to both the charging switch 612a and the discharging switch 614a. The inductor 630a may also be coupled to the positive terminal of the battery 644. Depending on the first input voltage 640a and the charging voltage needed to charge the battery 644, the first controller/gate driver 624a may alternate between turning on the second power field-effect transistor (FET) 622b (with the third power field-effect transistor (FET) 622c turned off), allowing the inductor 630a to charge the capacitor 632a, and turning on the third power field-effect transistor (FET) 622c (with the second power field-effect transistor (FET) 622b turned off), allowing the inductor 630a to discharge the capacitor 632a.

The voltage across the capacitor 632a may be referred to as the first charging voltage 628a. If a higher first charging voltage 628a is needed, the charging switch 612a will be turned on longer relative to the discharging switch 614a. Likewise, if a lower first charging voltage 628a is needed, the discharging switch 614a will be turned on longer relative to the charging switch 612a. The first charging voltage 628a may operate as a current source 626 to the battery 644, charging the battery 644 during a first phase.

The second port switch 608c may be coupled between the second port 606b and the reverse boost switch 608d. In this configuration, both the second port switch 608c and the reverse boost switch 608d are open. The reverse boost switch 608d may be coupled to the charging switch 612b of the second buck 610b. The multiphase switch 608b may be coupled between the first port switch 608a and the second buck converter 610b. Since the multiphase switch 608b is closed in this configuration, the first input voltage 640a may be provided to the second buck 610b.

The second buck 610b may include the charging switch 612b and a discharging switch 614b. The charging switch 612b may include a sixth diode 620f and a sixth power field-effect transistor (FET) 622f. The drain of the sixth power field-effect transistor (FET) 622f may be coupled to the reverse boost switch 608d. The gate of the sixth power field-effect transistor (FET) 622f may be coupled to the second controller/gate driver 624b. The cathode of the sixth diode 620f may be coupled to the drain of the sixth power field-effect transistor (FET) 622f. The anode of the sixth diode 620f may be coupled to the source of the sixth power field-effect transistor (FET) 622f.

The discharging switch 614b may include a seventh power field-effect transistor (FET) 622g and a seventh diode 620g. The drain of the seventh power field-effect transistor (FET) 622g may be coupled to the source of the sixth power field-effect transistor (FET) 622f. The source of the seventh power field-effect transistor (FET) 622g may be coupled to ground. The gate of the seventh power field-effect transistor (FET) 622g may be coupled to the second controller/gate driver 624b. The anode of the seventh diode 620g may be coupled to ground. The cathode of the seventh diode 620g may be coupled to the drain of the seventh power field-effect transistor (FET) 622g.

The second buck 610b may also include an inductor 630b and a capacitor 632b. The capacitor 632b may be coupled between the inductor 630b and ground. The inductor 630b may be coupled between the capacitor 632b and the drain of the seventh power field-effect transistor (FET) 622g. Thus, the inductor 630b is coupled to both the charging switch 612b and the discharging switch 614b. The inductor 630b may also be coupled to the positive terminal of the battery 644. Depending on the first input voltage 640a and the charging voltage needed to charge the battery 644, the second controller/gate driver 624b may alternate between turning on the sixth power field-effect transistor (FET) 622f (with the seventh power field-effect transistor (FET) 622g turned off), allowing the inductor 630b to charge the capacitor 632b, and turning on the seventh power field-effect transistor (FET) 622g (with the sixth power field-effect transistor (FET) 622f turned off), allowing the inductor 630b to discharge the capacitor 632b.

The voltage across the capacitor 632b may be referred to as the second charging voltage 628b. If a higher second charging voltage 628b is needed, the charging switch 612b will be turned on longer relative to the discharging switch 614b. Likewise, if a lower second charging voltage 628b is needed, the discharging switch 614b will be turned on longer relative to the charging switch 612b. The second charging voltage 628b may operate as a current source 626 to the battery 644, charging the battery 644 during a second phase.

Figure 7:
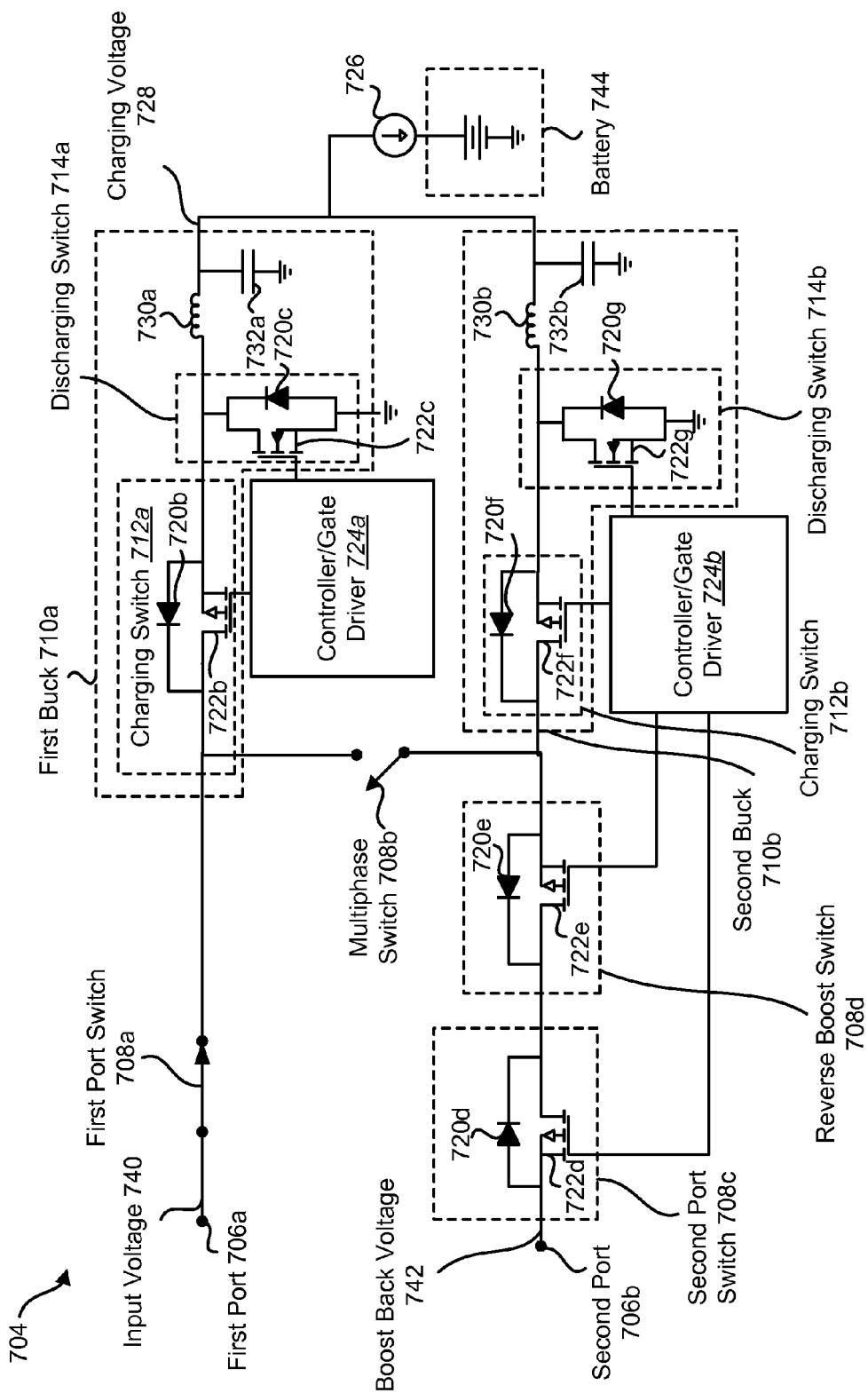
FIG. 7 is a circuit diagram illustrating a multiphase charger that is operating using a single charger and boost back mode.

FIG. 7 is a circuit diagram illustrating a multiphase charger 704 that is operating using a single charger and boost back mode. The multiphase charger 704 of FIG. 7 may be one configuration of the multiphase charger 104 of FIG. 1. The multiphase charger 704 may be located on an electronic device 102 that includes a first port 706a and a second port 706b. The multiphase charger 704 may include a first port switch 708a, a second port switch 708c, a multiphase switch 708b, a reverse boost switch 708d, a first buck 710a and a second buck 710b. The multiphase charger 704 may charge the battery 744 using a charger while powering an external device (via the second port 706b) using a boost back voltage 742. The charging source may be coupled to the first port 706a. The multiphase charger 704 may receive a first input voltage 740a from the first port 706a.

A first controller/gate driver 724a may control the first port switch 708a, the multiphase switch 708b and the first buck 710a. A second controller/gate driver 724b may control the second port switch 708c, the reverse boost switch 708d and the second buck 710b. For simplicity, some of the switches in FIG. 7 are illustrated as open or closed. Specifically, in this configuration the first port switch 708a is closed and the multiphase switch 708b is open. The second port switch 708c and the reverse boost switch 708d may switch on and off to provide the appropriate boost back voltage 742.

The second controller/gate driver 724b may control the switching of the second charging switch 712b and the discharging switch 714b in a manner that a boosted voltage appears at the junction of the reverse boost switch 708d and the second charging switch 712b. By closing the multiphase switch 708b and the second port switch 708c, this boosted voltage appears on the second port 706b. The charge is essentially current multiplied by time. So, if during a given time, the first port 706a increases the battery 744 charge by C, and the external device on the second port 706b removes a charge from the battery 744 of ½ C, then the battery is left with a positive increase in charge of ½ C. Thus, the battery 744 would charge at half the rate of charge if no external device was connected.

The first buck 710a may include a charging switch 712a and a discharging switch 714a. The first port switch 708a may be coupled between the first port 706a and the charging switch 712a. As discussed above, the first port switch 708a may be closed. The charging switch 712a may include a second diode 720b and a second power field-effect transistor (FET) 722b. The drain of the second power field-effect transistor (FET) 722b may be coupled to the first port switch 708a. The gate of the second power field-effect transistor (FET) 722b may be coupled to the first controller/gate driver 724a. The cathode of the second diode 720b may be coupled to the drain of the second power field-effect transistor (FET) 722b. The anode of the second diode 720b may be coupled to the source of the second power field-effect transistor (FET) 722b.

The discharging switch 714a may include a third power field-effect transistor (FET) 722c and a third diode 720c. The drain of the third power field-effect transistor (FET) 722c may be coupled to the source of the second power field-effect transistor (FET) 722*b*. The source of the third power field-effect transistor (FET) 722*c* may be coupled to ground. The gate of the third power field-effect transistor (FET) 722*c* may be coupled to the first controller/gate driver 724*a*. The anode of the third diode 720*c* may be coupled to ground. The cathode of the third diode 720*c* may be coupled to the drain of the third power field-effect transistor (FET) 722*c*.

The first buck 710*a* may also include an inductor 730*a* and a capacitor 732*a*. The capacitor 732*a* may be coupled between the inductor 730*a* and ground. The inductor 730*a* may be coupled between the capacitor 732*a* and the drain of the third power field-effect transistor (FET) 722*c*. Thus, the inductor 730*a* is coupled to both the charging switch 712*a* and the discharging switch 714*a*. The inductor 730*a* may also be coupled to the positive terminal of the battery 744. Depending on the input voltage 740 and the charging voltage 728 needed to charge the battery 744, the first controller/gate driver 724*a* may alternate between turning on the second power field-effect transistor (FET) 722*b* (with the third power field-effect transistor (FET) turned off 722*c*), allowing the inductor 730*a* to charge the capacitor 732*a*, and turning on the third power field-effect transistor (FET) 722*c* (with the second power field-effect transistor (FET) turned off 722*b*), allowing the inductor 730*a* to discharge the capacitor 732*a*.

The voltage across the capacitor 732*a* may be referred to as the charging voltage 728. If a higher charging voltage 728 is needed, the charging switch 712*a* will be turned on longer relative to the discharging switch 714*a*. Likewise, if a lower charging voltage 728 is needed, the discharging switch 714*a* will be turned on longer relative to the charging switch 712. The charging voltage 728 may operate as a current source 726 to the battery 744, charging the battery 744 during a first phase.

The second port switch 708*c* may include a fourth diode 720*d* and a fourth power field-effect transistor (FET) 722*d*. The source of the fourth power field-effect transistor (FET) 722*d* may be coupled to the second port 706*b*. The anode of the fourth diode 720*d* may be coupled to the source of the fourth power field-effect transistor (FET) 722*d*. The cathode of the fourth diode 720*d* may be coupled to the drain of the fourth power field-effect transistor (FET) 722*d*. The gate of the fourth power field-effect transistor (FET) 722*d* may be coupled to a second controller/gate driver 724*b*. The second controller/gate driver 724*b* may control the second port switch 708*c*, the reverse boost switch 708*d* and the second buck 710*b*.

The reverse boost switch 708*d* may include a fifth diode 720*e* and a fifth power field-effect transistor (FET) 722*e*. The drain of the fifth power field-effect transistor (FET) 722*e* may be coupled to the drain of the fourth power field-effect transistor (FET) 722*d*. The gate of the fifth power field-effect transistor (FET) 722*e* may be coupled to the second controller/gate driver 724*b*. The anode of the fifth diode 720*e* may be coupled to the source of the fifth power field-effect transistor (FET) 722*e*. The cathode of the fifth diode 720*e* may be coupled to the drain of the fifth power field-effect transistor (FET) 722*e*.

The second buck 710*b* may include the charging switch 712*b* and a discharging switch 714*b*. The charging switch 712*b* may include a sixth diode 720*f* and a sixth power field-effect transistor (FET) 722*f*. The drain of the sixth power field-effect transistor (FET) 722*f* may be coupled to the reverse boost switch 708*d*. The gate of the sixth power field-effect transistor (FET) 722*f* may be coupled to the second controller/gate driver 724*b*. The cathode of the sixth diode 720*f* may be coupled to the drain of the sixth power field-effect transistor (FET) 722*f*. The anode of the sixth diode 720*f* may be coupled to the source of the sixth power field-effect transistor (FET) 722*f*.

The discharging switch 714*b* may include a seventh power field-effect transistor (FET) 722*g* and a seventh diode 720*g*. The drain of the seventh power field-effect transistor (FET) 722*g* may be coupled to the source of the sixth power field-effect transistor (FET) 722*f*. The source of the seventh power field-effect transistor (FET) 722*g* may be coupled to ground. The gate of the seventh power field-effect transistor (FET) 722*g* may be coupled to the second controller/gate driver 724*b*. The anode of the seventh diode 720*g* may be coupled to ground. The cathode of the seventh diode 720*g* may be coupled to the drain of the seventh power field-effect transistor (FET) 722*g*.

The second buck 710*b* may also include an inductor 730*b* and a capacitor 732*b*. The capacitor 732*b* may be coupled between the inductor 730*b* and ground. The inductor 730*b* may be coupled between the capacitor 732*b* and the drain of the seventh power field-effect transistor (FET) 722*g*. Thus, the inductor 730*b* is coupled to both the charging switch 712*b* and the discharging switch 714*b*. The inductor 730*b* may also be coupled to the positive terminal of the battery 744.

Figure 8:
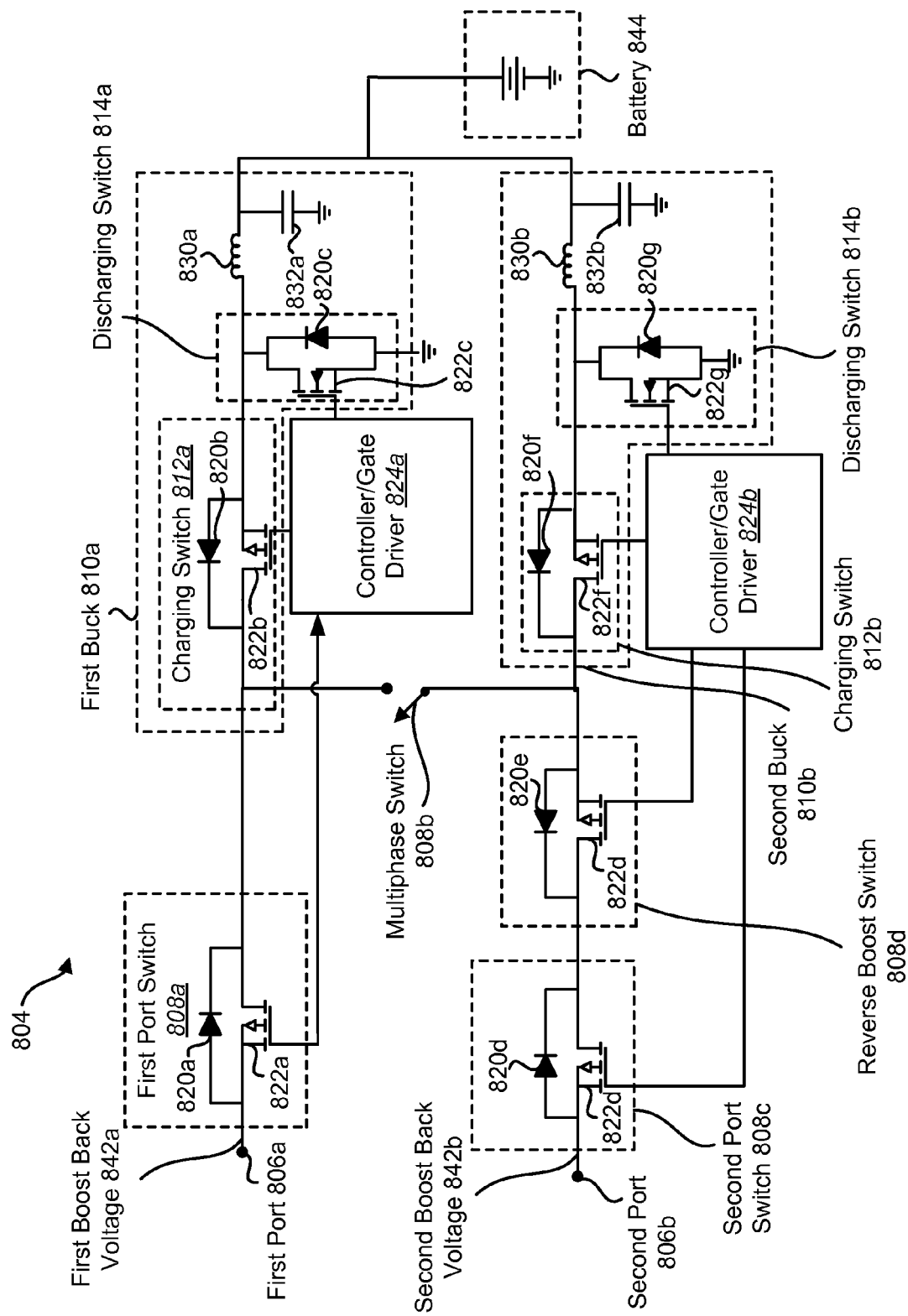
FIG. 8 is a circuit diagram illustrating a multiphase charger that is operating in dual boost back mode.

FIG. 8 is a circuit diagram illustrating a multiphase charger 804 that is operating in dual boost back mode. The multiphase charger 804 of FIG. 8 may be one configuration of the multiphase charger 104 of FIG. 1. The multiphase charger 804 may include a first port switch 808*a*, a second port switch 808*c*, a multiphase switch 808*b*, a reverse boost switch 808*d*, a first buck 810*a* and a second buck 810*b*. The multiphase charger 804 may provide a first boost back voltage 842*a* to the first port 806*a* and a second boost back voltage 842*b* to the second port 806*b*. For simplicity, some of the switches in FIG. 8 are illustrated as open (in this configuration, the multiphase switch 808*b* is open).

The first port switch 808*a* may include a first diode 820*a* and a first power field-effect transistor (FET) 822*a*. The source of the first power field-effect transistor (FET) 822*a* may be coupled to the first port 806*a*. The anode of the first diode 820*a* may be coupled to the source of the first power field-effect transistor (FET) 822*a*. The cathode of the first diode 820*a* may be coupled to the drain of the first power field-effect transistor (FET) 822*a*. The gate of the first power field-effect transistor (FET) 822*a* may be coupled to a first controller/gate driver 824*a*. The first controller/gate driver 824*a* may control the first port switch 808*a*, the multiphase switch 808*b* and the first buck 810*a*.

The first buck 810*a* may include a charging switch 812*a* and a discharging switch 814*a*. The charging switch 812*a* may include a second diode 820*b* and a second power field-effect transistor (FET) 822*b*. The drain of the second power field-effect transistor (FET) 822*b* may be coupled to the drain of the first power field-effect transistor (FET) 822*a*. The gate of the second power field-effect transistor (FET) 822*b* may be coupled to the first controller/gate driver 824*a*. The cathode of the second diode 820*b* may be coupled to the drain of the second power field-effect transistor (FET) 822*b*. The anode of the second diode 820*b* may be coupled to the source of the second power field-effect transistor (FET) 822*b*.

The discharging switch 814*a* may include a third power field-effect transistor (FET) 822*c* and a third diode 820*c*. The drain of the third power field-effect transistor (FET) 822*c* may be coupled to the source of the second power field-effect transistor (FET) 822*b*. The source of the third power field-effect transistor (FET) 822*c* may be coupled to ground. The gate of the third power field-effect transistor (FET) 822*c* may be coupled to the first controller/gate driver 824*a*. The anode of the third diode 820c may be coupled to ground. The cathode of the third diode 820c may be coupled to the drain of the third power field-effect transistor (FET) 822c.

The first buck 810a may also include an inductor 830a and a capacitor 832a. The capacitor 832a may be coupled between the inductor 830a and ground. The inductor 830a may be coupled between the capacitor 832a and the drain of the third power field-effect transistor (FET) 822c. Thus, the inductor 830a is coupled to both the charging switch 812a and the discharging switch 814a. The inductor 830a may also be coupled to the positive terminal of the battery 844.

The second port switch 808c may include a fourth diode 820d and a fourth power field-effect transistor (FET) 822d. The source of the fourth power field-effect transistor (FET) 822d may be coupled to the second port 806b. The anode of the fourth diode 820d may be coupled to the source of the fourth power field-effect transistor (FET) 822d. The cathode of the fourth diode 820d may be coupled to the drain of the fourth power field-effect transistor (FET) 822d. The gate of the fourth power field-effect transistor (FET) 822d may be coupled to a second controller/gate driver 824b. The second controller/gate driver 824b may control the second port switch 808c, the reverse boost switch 808d and the second buck 810b.

The reverse boost switch 808d may include a fifth diode 820e and a fifth power field-effect transistor (FET) 822e. The drain of the fifth power field-effect transistor (FET) 822e may be coupled to the drain of the fourth power field-effect transistor (FET) 822d. The gate of the fifth power field-effect transistor (FET) 822e may be coupled to the second controller/gate driver 824b. The anode of the fifth diode 820e may be coupled to the source of the fifth power field-effect transistor (FET) 822e. The cathode of the fifth diode 820e may be coupled to the drain of the fifth power field-effect transistor (FET) 822e.

The second buck 810b may include a charging switch 812b and a discharging switch 814b. The charging switch 812b may include a sixth diode 820f and a sixth power field-effect transistor (FET) 822f. The drain of the sixth power field-effect transistor (FET) 822f may be coupled to the drain of the fifth power field-effect transistor (FET) 822e. The gate of the sixth power field-effect transistor (FET) 822f may be coupled to the second controller/gate driver 824b. The cathode of the sixth diode 820f may be coupled to the drain of the sixth power field-effect transistor (FET) 822f. The anode of the sixth diode 820f may be coupled to the source of the sixth power field-effect transistor (FET) 822f.

The discharging switch 814b may include a seventh power field-effect transistor (FET) 822g and a seventh diode 820g. The drain of the seventh power field-effect transistor (FET) 822g may be coupled to the source of the sixth power field-effect transistor (FET) 822f. The source of the seventh power field-effect transistor (FET) 822g may be coupled to ground. The gate of the seventh power field-effect transistor (FET) 822g may be coupled to the second controller/gate driver 824b. The anode of the seventh diode 820g may be coupled to ground. The cathode of the seventh diode 820g may be coupled to the drain of the seventh power field-effect transistor (FET) 822g.

The second buck 810b may also include an inductor 830b and a capacitor 832b. The capacitor 832b may be coupled between the inductor 830b and ground. The inductor 830b may be coupled between the capacitor 832b and the drain of the seventh power field-effect transistor (FET) 822g. Thus, the inductor 830b is coupled to both the charging switch 812b and the discharging switch 814b. The inductor 830b may also be coupled to the positive terminal of the battery 844.

The multiphase switch 808b may be coupled between the first buck 810a and the second buck 810b. The multiphase switch 808b is open in this configuration. In one configuration, the multiphase switch 808b may be replaced with an NMOS configurable back gate.

Figure 9:
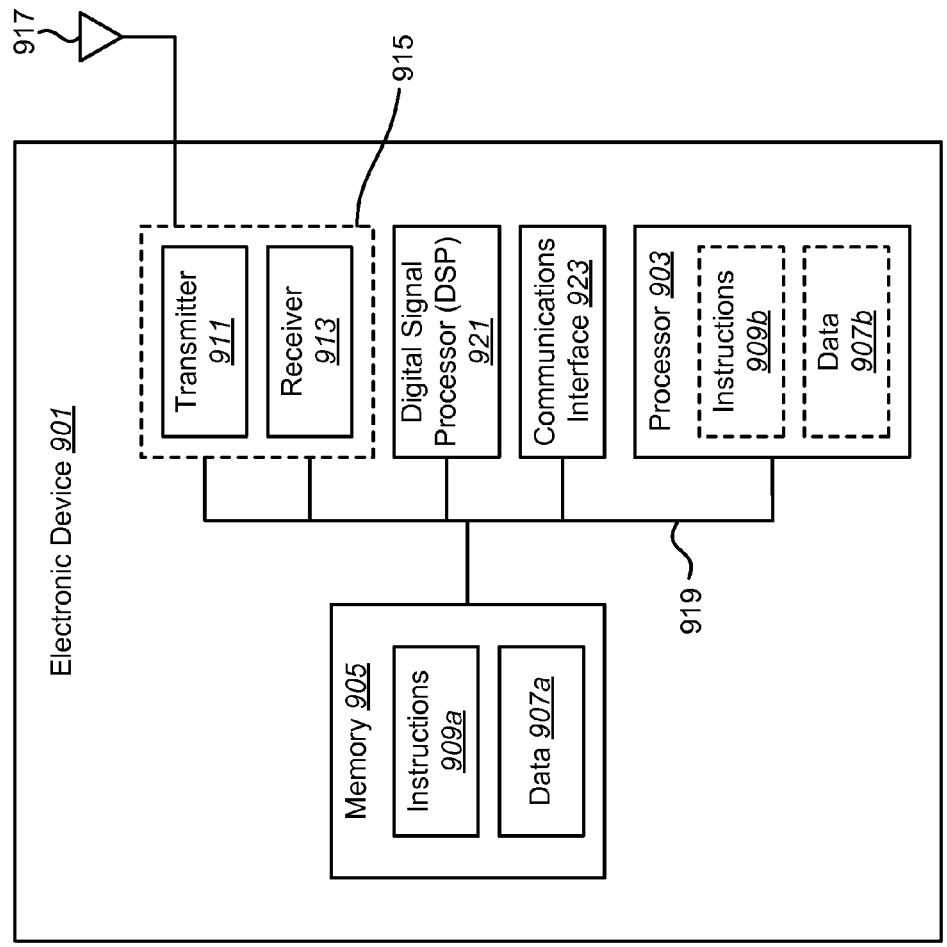
FIG. 9 illustrates certain components that may be included within a wireless communication device.

FIG. 9 illustrates certain components that may be included within an electronic device 901. The electronic device 901 may be an access terminal, a mobile station, a user equipment (UE), a base station, an access point, a handheld computing device, a video game apparatus, a personal computer, etc. The electronic device 901 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the electronic device 901 of FIG. 9, in an alternative configuration, a combination of processors (e.g., an ARM and DSP) could be used.

The electronic device 901 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The electronic device 901 may also include a transmitter 911 and a receiver 913 to allow transmission and reception of signals to and from the electronic device 901. The transmitter 911 and receiver 913 may be collectively referred to as a transceiver 915. An antenna 917 may be electrically coupled to the transceiver 915. The electronic device 901 may also include (not shown) multiple transmitters, multiple receivers, multiple transceivers and/or multiple antennas.

The electronic device 901 may include a digital signal processor (DSP) 921. The electronic device 901 may also include a communications interface 923. The communications interface 923 may allow a user to interact with the electronic device 901.

The various components of the electronic device 901 may be coupled together by one or more buses, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An electronic device, comprising:
 a first port;
 a second port; and
 a multiphase charger, the multiphase charger comprising:
  a first buck;
  a second buck;
  a first port switch;
  a second port switch;
  a reverse boost switch; and
  a multiphase switch,
 wherein the first port switch is coupled between the first port and the first buck, wherein the multiphase switch is coupled between the first buck and the second buck, wherein the second port switch is coupled between the second port and the reverse boost switch, and wherein the reverse boost switch is coupled between the second port switch and the second buck,
 wherein the multiphase charger allows the electronic device to operate in one of a dual charging mode, charging on one port and boosting back on another port mode, single boost back mode and dual boost back mode,
 wherein the first buck comprises a first charging switch, a first discharging switch, a first inductor and a first capacitor, and
 wherein the second buck comprises a second charging switch, a second discharging switch, a second inductor and a second capacitor.

2. The electronic device of claim 1, wherein the electronic device is operating in charging on one port and boosting back on another port mode, wherein an external charger provides an input voltage to the first port, wherein the second port switch and the reverse boost switch provide a boost back voltage to the second port to power an external device, wherein the first port switch is closed, the second port switch is closed, the reverse boost switch is closed, and the multiphase switch is open.

3. The electronic device of claim 1, wherein the electronic device is operating in charging on one port and boosting back on another port mode, wherein an external charger provides an input voltage to the second port, wherein a polarity of a diode in the multiphase switch is flipped, wherein the first port switch and the multiphase switch provide a boost back voltage to the first port to power an external device, wherein the first port switch is closed, the second port switch is closed, the reverse boost switch is closed, and the multiphase switch is open.

4. The electronic device of claim 1, wherein a ratio between the first charging switch turned on and the first discharging switch turned on adjusts a voltage output by the first buck.

5. The electronic device of claim 1, wherein a controller/gate driver controls the first charging switch and the first discharging switch in the first buck.

6. The electronic device of claim 1, wherein a first controller/gate driver controls the first port switch, the multiphase switch and the first buck, and wherein a second controller/gate driver controls the second port switch, the reverse boost switch and the second buck.

7. The electronic device of claim 1, wherein the electronic device is operating in dual charging mode, wherein a first charger is coupled to the first port, wherein a second charger is coupled to the second port, wherein the multiphase switch is open, wherein the first buck charges a battery during a first phase, wherein the second buck charges the battery during a second phase, and wherein the first port switch, the second port switch and the reverse boost switch are closed.

8. The electronic device of claim 7, wherein the first charger provides a first input voltage to the first port, and wherein the second charger provides a second input voltage to the second port.

9. The electronic device of claim 1, wherein the electronic device is operating in single boost back mode, and wherein the multiphase charger provides a boost back voltage to the second port.

10. The electronic device of claim 1, wherein the multiphase charger delivers power to a battery, wherein the multiphase charger delivers a first half of the power through the first buck, and a second half of the power through the second buck.

11. The electronic device of claim 1, wherein the first buck is 180 degrees out of phase from the second buck.

12. A method for using a multiphase charger on an electronic device that comprises a first port and a second port, the method comprising:
   providing a boost back voltage to an external device via the second port;
   detecting a charging voltage on the first port; and
   adjusting a first port switch, a second port switch, a multiphase switch and a reverse boost switch to provide the charging voltage to a battery and the boost back voltage to the external device,
   wherein the multiphase charger comprises:
      a first buck,
      a second buck,
      the first port switch,
      the second port switch,
      the reverse boost switch, and
      the multiphase switch,
   wherein the first port switch is coupled between the first port and the first buck, wherein the multiphase switch is coupled between the first buck and the second buck, wherein the second port switch is coupled between the second port and the reverse boost switch, and wherein the reverse boost switch is coupled between the second port switch and the second buck,
   wherein the multiphase charger allows the electronic device to operate in one of a dual charging mode, charging on one port and boosting back on another port mode, single boost back mode and dual boost back mode,
   wherein the first buck comprises a first charging switch, a first discharging switch, a first inductor and a first capacitor, and
   wherein the second buck comprises a second charging switch, a second discharging switch, a second inductor and a second capacitor.

13. The method of claim 12, wherein the electronic device is operating in charging on one port and boosting back on another port mode, wherein an external charger provides an input voltage to the second port, wherein a polarity of a diode in the multiphase switch is flipped, wherein the first port switch and the multiphase switch provide a boost back voltage to the first port to power an external device, wherein the first port switch is closed, the second port switch is closed, the reverse boost switch is closed, and the multiphase switch is open.

14. The method of claim 12, wherein a ratio between the first charging switch turned on and the first discharging switch turned on adjusts a voltage output by the first buck.

15. The method of claim 12, wherein a controller/gate driver controls the first charging switch and the first discharging switch in the first buck.

16. The method of claim 12, wherein a first controller/gate driver controls the first port switch, the multiphase switch and the first buck, and wherein a second controller/gate driver controls the second port switch, the reverse boost switch and the second buck.

17. The method of claim 12, wherein the electronic device is operating in charging on one port and boosting back on another port mode, and wherein the multiphase charger provides the boost back voltage to the second port.

18. The method of claim 17, wherein the boost back voltage is provided to the second port by charging a capacitor coupled between the second port and ground using the second buck.

19. The method of claim 12, wherein the multiphase charger delivers power to a battery, wherein the multiphase charger delivers a first half of the power through the first buck, and a second half of the power through the second buck.

20. The method of claim 12, wherein the first buck is 180 degrees out of phase from the second buck.

21. An apparatus, comprising:
   a first port;
   a second port;
   a multiphase charger;
   means for providing a boost back voltage to an external device via the second port;
   means for detecting a charging voltage on the first port; and
   means for adjusting a first port switch, a second port switch, a multiphase switch and a reverse boost switch to provide the charging voltage to a battery and the boost back voltage to the external device,
   wherein the multiphase charger comprises:
      a first buck,
      a second buck,
      the first port switch,
      the second port switch,
      the reverse boost switch, and
      the multiphase switch,
   wherein the first port switch is coupled between the first port and the first buck, wherein the multiphase switch is coupled between the first buck and the second buck, wherein the second port switch is coupled between the second port and the reverse boost switch, and wherein the reverse boost switch is coupled between the second port switch and the second buck, wherein the multiphase charger allows the apparatus to operate in one of a dual charging mode, charging on one port and boosting back on another port mode, single boost back mode and dual boost back mode, wherein the first buck comprises a first charging switch, a first discharging switch, a first inductor and a first capacitor, and wherein the second buck comprises a second charging switch, a second discharging switch, a second inductor and a second capacitor.

22. The apparatus of claim 21, wherein the apparatus is operating in charging on one port and boosting back on another port mode, wherein an external charger provides an input voltage to the second port, wherein a polarity of a diode in the multiphase switch is flipped, wherein the first port switch and the multiphase switch provide a boost back voltage to the first port to power an external device, wherein the first port switch is closed, the second port switch is closed, the reverse boost switch is closed, and the multiphase switch is open.

23. The apparatus of claim 21, wherein the multiphase charger delivers power to a battery, wherein the multiphase charger delivers a first half of the power through the first buck, and a second half of the power through the second buck.

24. The apparatus of claim 21, wherein the first buck is 180 degrees out of phase from the second buck.

25. A computer-program product for using a multiphase charger on an electronic device that comprises a first port and a second port, the computer-program product comprising a non-transitory computer-readable medium having instructions thereon, which when executed causes one or more processors to perform the following:

causing an electronic device to provide a boost back voltage to an external device via the second port;

causing the electronic device to detect a charging voltage on the first port; and causing the electronic device to adjust a first port switch, a second port switch, a multiphase switch and a reverse boost switch to provide the charging voltage to a battery and the boost back voltage to the external device, wherein the multiphase charger comprises:
a first buck,
a second buck,
the first port switch,
the second port switch,
the reverse boost switch, and
the multiphase switch, wherein the first port switch is coupled between the first port and the first buck, wherein the multiphase switch is coupled between the first buck and the second buck, wherein the second port switch is coupled between the second port and the reverse boost switch, and wherein the reverse boost switch is coupled between the second port switch and the second buck, wherein the multiphase charger allows the electronic device to operate in one of a dual charging mode, charging on one port and boosting back on another port mode, single boost back mode and dual boost back mode, wherein the first buck comprises a first charging switch, a first discharging switch, a first inductor and a first capacitor, and wherein the second buck comprises a second charging switch, a second discharging switch, a second inductor and a second capacitor.

26. The computer-program product of claim 25, wherein the electronic device is operating in charging on one port and boosting back on another port mode, wherein an external charger provides an input voltage to the second port, wherein a polarity of a diode in the multiphase switch is flipped, wherein the first port switch and the multiphase switch provide a boost back voltage to the first port to power an external device, wherein the first port switch is closed, the second port switch is closed, the reverse boost switch is closed, and the multiphase switch is open.

27. The computer-program product of claim 25, wherein the multiphase charger delivers power to a battery, wherein the multiphase charger delivers a first half of the power through the first buck, and a second half of the power through the second buck.

28. The computer-program product of claim 25, wherein the first buck is 180 degrees out of phase from the second buck.

* * * * *